US011966471B2

United States Patent
Brown et al.

(10) Patent No.: US 11,966,471 B2
(45) Date of Patent: Apr. 23, 2024

(54) INTERRUPT LATENCY AND INTERVAL TRACKING

(71) Applicant: Hewlett-Packard Development Company, L.P., Spring, TX (US)

(72) Inventors: Gary T. Brown, Boise, ID (US); Vincent C. Skurdal, Boise, ID (US); Marvin Nelson, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 302 days.

(21) Appl. No.: 17/490,681

(22) Filed: Sep. 30, 2021

(65) Prior Publication Data

US 2023/0102435 A1 Mar. 30, 2023

(51) Int. Cl.
*H04L 29/06* (2006.01)
*G06F 11/30* (2006.01)
*G06F 11/32* (2006.01)
*G06F 11/34* (2006.01)
*G06F 13/24* (2006.01)
*G06F 21/55* (2013.01)

(52) U.S. Cl.
CPC ........ *G06F 21/554* (2013.01); *G06F 11/3041* (2013.01); *G06F 11/327* (2013.01); *G06F 11/349* (2013.01); *G06F 13/24* (2013.01); *G06F 2221/034* (2013.01)

(58) Field of Classification Search
CPC ............. G06F 21/554; G06F 2221/034; G06F 11/3041; G06F 11/327; G06F 11/349; G06F 13/24
See application file for complete search history.

(56) References Cited

U.S. PATENT DOCUMENTS

2010/0306323 A1* 12/2010 Gourevitch ......... H04L 43/0858
709/206
2015/0089305 A1* 3/2015 Baumeister ......... G06F 11/0772
714/51

\* cited by examiner

*Primary Examiner* — Evans Desrosiers
(74) *Attorney, Agent, or Firm* — Brooks, Cameron & Huebsch, PLLC (57) ABSTRACT

Secure circuitry detects a latency between when an interrupt occurred and when the interrupt was released in correspondence with handling of the interrupt. The secure circuitry detects an interval between consecutive occurrences of the interrupt. In response to either or both of the latency exceeding a latency limit and the interval exceeding an interval limit, the secure circuitry performs an action.

14 Claims, 6 Drawing Sheets

INTERRUPT LATENCY AND INTERVAL TRACKING

BACKGROUND

Computing devices include general-purpose computing devices as well as application-specific computing devices. General-purpose computing devices include desktop, laptop, notebook, and server computers, as well as smartphones, tablet computing devices, and other types of computing devices. Application-specific computing devices are also referred to as embedded systems, and are devices designed to perform dedicated functions, either as independent systems or as part of larger systems. Embedded systems can be implemented in conjunction with peripheral devices, such as printing and other types of devices, as well as devices as disparate as kitchen appliances, automotive electronics, network cameras, and so on.

Both general-purpose and application-specific computing devices often have network connectivity, permitting them to be globally connected with other computing devices via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyber attacks that likewise were unimaginable decades ago. Computing devices are also susceptible to cyber attack even if not connected to the Internet or another network.

DETAILED DESCRIPTION

As noted in the background, computing devices include general-purpose computing devices as well as application-specific computing devices that are also referred to as embedded systems. Both types of computing devices can be susceptible to cyber attacks to cause the devices to perform impermissible functionality, to otherwise compromise the devices to impermissibly access data stored by the devices, and so on. That a computing device has been compromised may be indicated via delays in the processing of interrupts and the suppression of interrupts such that they do not occur.

An interrupt is an event that occurs which can require immediate attention from a processor of a computing device. An interrupt alerts the processor to suspend its current activities, save its state, and execute a function referred to as an interrupt handler or an interrupt service routine (ISR) to handle the interrupt. The interruption in processing the interrupt is temporary, and the processor resumes its prior activities after the interrupt handler is finished. Interrupts are commonly used by hardware components to indicate electronic or physical state changes that require attention, and are also commonly used to implement multitasking, particularly in real-time computing scenarios. Systems that use interrupts in these ways are often said to be interrupt driven.

The proper operation of a computing device may hinge on the ability of hardware and software components regularly raising interrupts, and on the processor of the device timely handling the interrupts. Therefore, if a nefarious party has compromised the security of a computing device, interrupt occurrence and processing may be affected. Particularly in an embedded system, the processor may be expected to handle an interrupt within a specified length of time after the interrupt has been raised, which is referred to as interrupt latency. If interrupt latency is greater than expected, then this may indicate that the computing device has been compromised.

Also in an embedded system in particular, certain interrupts may be expected to occur at regular intervals. The length of time between consecutive occurrences of a given interrupt is referred to as the interval of the interrupt. If the interrupt interval is greater than expected, then this may also indicate that the computing device has been compromised. Interrupt monitoring can thus be employed as a way to detect whether the security of a computing device has potentially been compromised by a nefarious party.

Techniques described herein monitor both interrupt latency and interrupt interval within a computing device via secure circuitry of an integrated circuit (IC) of the computing device. The secure circuitry detects or tracks latencies of interrupts, and likewise detects or tracks intervals of the interrupts. The latency of an interrupt is the length of time between when an interrupt has been raised and when it has been released. The interval of an interrupt is the length of time between consecutive assertions or occurrences of the interrupt. If the latency of an interrupt is greater than a maximum latency limit, or if the interval of an interrupt is greater than a maximum interval limit, then an action can be performed as a result of the computing device having potentially been compromised.

Figure 1:
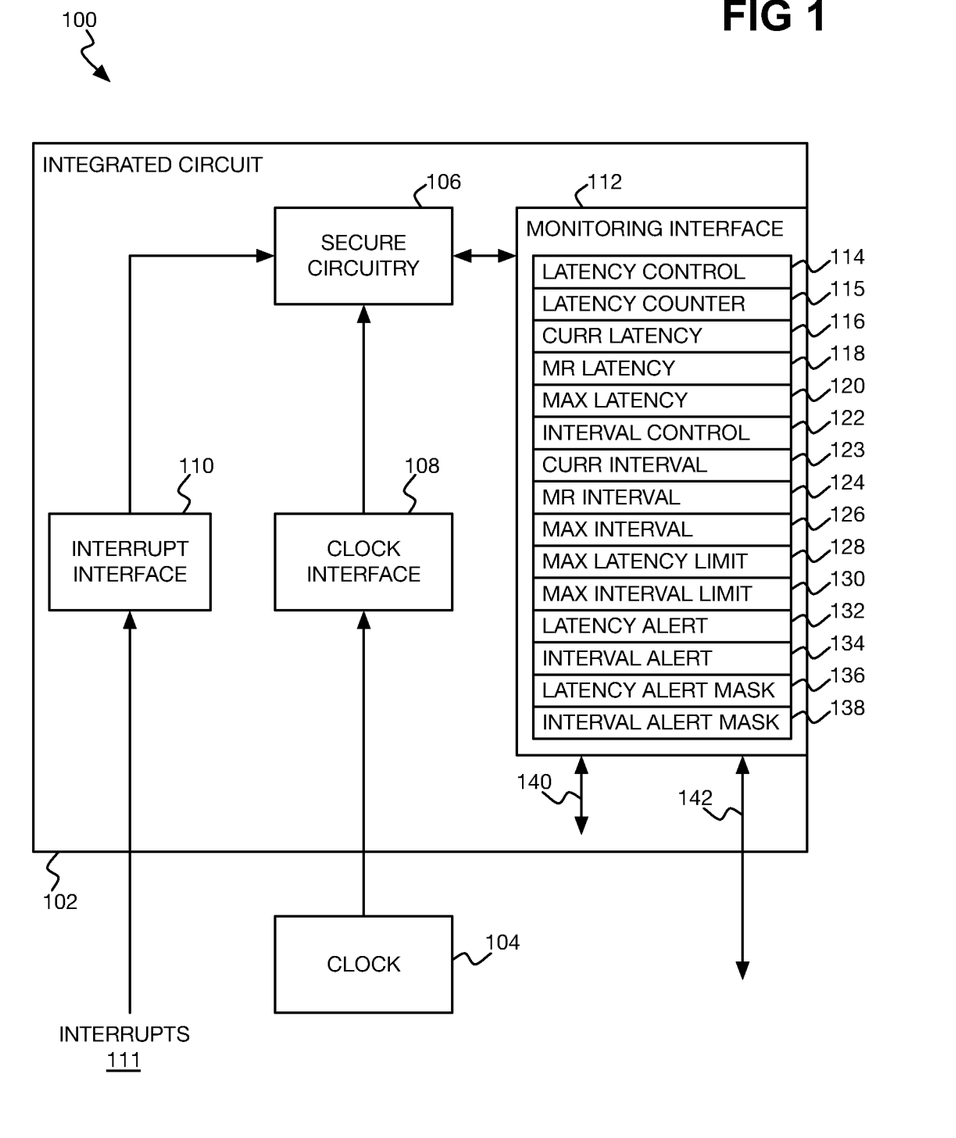
FIG. 1 is a diagram of an example computing device including an integrated circuit (IC) having secure circuitry to monitor interrupts generated within the computing device.

FIG. 1 shows an example computing device 100. The computing device 100 may be a general-purpose computing device, or the device 100 may be an application-specific computing device (i.e., an embedded system). The computing device 100 includes an IC 102 and a time clock 104. In the example, the time clock 104 is external to the IC 102, but in another implementation may be internal to (i.e., part of) the IC 102. The computing device 100 can include other components external to the IC 102, such as one or multiple processors, memory, and so on.

The IC 102 is security hardened in that the IC 102 is securely isolated from other components of the device 100 and is inaccessible to such components except via provided interfaces of the IC 102. The time clock 104 may be a crystal oscillator or another type of time clock. The time clock 104 provides a time clock signal made up of clock cycles that regularly occur at a specified frequency.

The IC 102 includes secure circuitry 106, a clock interface 108, an interrupt interface 110, and a monitoring interface 112. The secure circuitry 106 may be in the form of an application-specific IC (ASIC) that is integrated within the IC 102. The secure circuitry 106 is secure at least in that it is part of the IC 102 that is securely isolated from components of the computing device 100 external to the IC 102.

The clock interface 108 is the interface by which the IC 102 interconnects with the time clock 104 to receive the clock signal provided by the clock 104. The clock interface 108 is an input interface, in that the IC 102 can receive or read the clock signal provided by the time clock 104 at the interface 108 but cannot provide information to the clock 104 on the interface 108 or otherwise write to interface 108. The secure circuitry 106 is communicatively connected to the clock interface 108.

The interrupt interface 110 is the interface by which the IC 102 monitors interrupts 111 raised by hardware and software components external to the IC 102 within the computing device 100. The interrupt interface 110 may be in the form of a multiple-bit interrupt register having bits corresponding to the different interrupts 111 that can occur within the computing device 100. For example, up to sixteen different interrupts 111 may be monitored, such that the interrupt register is a sixteen-bit register with a bit for each interrupt 111.

When an interrupt 111 is raised, is asserted, or occurs, the corresponding bit of the interrupt register transitions from zero to one (i.e., from low to high), and such a transition is referred to as the rising edge of the interrupt 111. When an interrupt 111 has been processed, handled, cleared, or released, such as by a processor of the computing device 100, the corresponding bit of the interrupt register transitions from one to zero (i.e., from high to low). Such a transition is referred to as the falling edge of the interrupt 111.

The interrupt interface 110 is an input interface, in that the IC 102 can receive or read the interrupts 111 at the interface 110 but may not be able to write to the interface 110. That is, the IC 102 may not be able to assert or clear the interrupts 111. The secure circuitry 106 is communicatively connected to the interrupt interface 110.

The monitoring interface 112 is the interface by which the IC 102 provides information as to monitoring of the interrupts 111 by the secure circuitry 106, and by which the IC 102 receives information as to how such monitoring is to be performed. The secure circuitry 106 is bidirectionally communicatively connected to the monitoring interface 112, and can read from and write to the interface 112. The monitoring interface 112 has a number of registers 114, 115, 116, 118, 120, 122, 123, 124, 126, 128, 130, 132, 134, 136, and 138, some of which are single-bit and others of which are multiple-bit registers, and some of which are read-only and others of which are write-only or read-and-write registers from the perspective of the secure circuitry 106.

Specifically, the monitoring interface 112 can include a latency control register 114. The latency control register 114 can be a multiple-bit register having bits corresponding to the interrupts 111. For example, if there are sixteen different interrupts 111 that are being monitored, then the control register 114 is a sixteen-bit register. A bit of the control register 114 is set to one (i.e., high) by a component within the IC 102 or by a component external to the IC 102 to indicate that the secure circuitry 106 is to monitor the latency of the corresponding interrupt 111. The bit is cleared to zero (i.e., low) to indicate that the secure circuitry 106 is not to monitor the latency of the corresponding interrupt 111. The latency control register 114 may be considered a read-only register from the perspective of the secure circuitry 106, in that the circuitry 106 can read the register 114 but may not write to the register 114.

The monitoring interface 112 can include a latency counter register 115. The latency counter register 115 can also be a multiple-bit register having a number of bits corresponding to the interrupts 111. The secure circuitry 106 sets a bit of the counter register 115 to one (i.e., high) when the corresponding interrupt 111 has been raised, and clears the bit of the register 115 to zero (i.e., low) once the interrupt 111 has been released. When the bit has been set, the secure circuitry 106 increases the latency of the corresponding interrupt 111 at each time clock change (e.g., with the rising edge of each clock cycle of the time clock 104). The latency counter register 115 may be considered a read-and-write register from the perspective of the secure circuitry 106, and may be able to be read but not written by other components of the IC 102 and/or components external to the IC 102.

The monitoring interface 112 can include a current latency register 116 and a most recent latency register 118 for each interrupt 111. For example, if there are sixteen interrupts 111 that are being monitored, then there are sixteen registers 116 and sixteen registers 118. The registers 116 and 118 are multiple-bit registers that each have a sufficient number of bits to store the latency of an interrupt 111. Interrupt latency is effectively measured as a multiple of the clock cycles of the time clock 104, as the length of time between when an interrupt 111 has been raised and when it has been released.

The current latency register 116 for an interrupt 111 stores the latency while it is currently being measured. That is, the interrupt 111 has been raised but has not yet been released. The most recent latency register 118 for an interrupt 111 stores the latency of the most recently completed occurrence of the interrupt 111—that is, the most recent time the interrupt 111 has been raised and then released. The latency registers 116 and 118 are read-and-write registers from the perspective of the secure circuitry 106, and may be able to be read but not written by other components of the IC 102 and/or components external to the IC 102.

The monitoring interface 112 can include a maximum latency register 120 for each interrupt 111. Therefore, if there are sixteen interrupts 111 that are being monitored, then there are sixteen registers 120. Each register 120 is a multiple-bit register that has a sufficient number of bits to store the latency of an interrupt 111. The maximum latency register 120 for an interrupt 111 stores the longest latency for the interrupt 111 that has been detected by the secure circuitry 106. The latency registers 120 are read-and-write registers from the perspective of the secure circuitry 106, and may be able to be read but not written by other components of the IC 102 and/or components external to the IC 102.

The monitoring interface 112 can include an interval control register 122. The interval control register 122 can be a multiple-bit register having bits corresponding to the interrupts 111. Therefore, if there are sixteen different interrupts 111 that are being monitored, then the control register 122 is a sixteen-bit register. A bit of the control register 122 is set to one (i.e., high) by a component within the IC 102 or by a component external to the IC 102 to indicate that the secure circuitry 106 is to monitor the interval of the corresponding interrupt 111. The bit is cleared to zero (i.e., low) to indicate that the secure circuitry 106 is not to monitor the interval of the corresponding interrupt. The interval control register 122 may be considered a read-only register from the perspective of the secure circuitry 106, in that the circuitry 106 can read the register 122 but may not write to the register 122.

The monitoring interface 112 can include a current interval register 123 and a most recent interval register 124 for each interrupt 111. For example, if there are sixteen interrupts 111 being monitored, then there are sixteen registers 123 and sixteen registers 124. The registers 123 and 124 are multiple-bit registers that each have a sufficient number of bits to store the interval of an interrupt 111. Interrupt interval is effectively measured as a multiple of the clock cycles of the time clock 104, as the length of time between consecutive raisings, assertions, or occurrences of an interrupt 111.

The current interval register 123 for an interrupt 111 stores the interval while it is currently being measured. That is, the interrupt 111 has been raised, and the interval until the interrupt 111 is raised again is being measured. The most recent interval register 124 for an interrupt 111 stores the interval of the interrupt 111 ending at the most recent raising of the interrupt 111—that is, the interval between the raising of the interrupt 111 prior to the most recent raising of the interrupt 111 and the most recent raising. The interval registers 123 and 124 are read-and-write registers from the perspective of the secure circuitry 106, and may be able to be read but not written by other components of the IC 102 and/or components external to the IC 102.

The monitoring interface can include a maximum interval register 126 for each interrupt 111. Therefore, if there are sixteen interrupts 111 being monitored, then there are sixteen registers 126. Each register 126 is a multiple-bit register that has a sufficient number of bits to store the interval of an interrupt 111. The maximum interval register 126 for an interrupt 111 stores the longest interval for the interrupt 111 that has been detected by the secure circuitry 106. The interval registers 126 are read-and-write registers from the perspective of the secure circuitry 106, and may be able to be read but not written by other components of the IC 102 and/or components external to the IC 102.

The monitoring interface 112 can include a maximum latency limit register 128 and a maximum interval limit register 130 for each interrupt 111. If there are sixteen interrupts 111 being monitored, for instance, then there are sixteen registers 128 and sixteen registers 130. In another implementation, there may be just one register 128 and one register 130 governing every interrupt 111, however. The registers 128 and 130 are multiple-bit registers that each have a sufficient number of bits to respectively store the latency and interval of an interrupt 111.

The maximum latency limit register 128 for an interrupt 111 stores the longest permissible latency that the interrupt 111 is expected to (i.e., can) have. That is, the maximum latency for an interrupt 111 is the longest expected or permitted delay between when the interrupt 111 is raised and when the interrupt 111 is processed and thus cleared during normal operation of the computing device 100. The maximum interval limit register 130 stores the longest possible interval that the interrupt 111 is expected (i.e., can) have. That is, the maximum interval for an interrupt is the longest expected or permitted duration between consecutive occurrences of the interrupt 111 during normal operation of the computing device 100.

If the latency of an interrupt 111 exceeds its corresponding maximum latency limit, or if the interval of an interrupt 111 exceeds its corresponding maximum interval limit, then the secure circuitry 106 may provide an alert to indicate the potential of security compromise of the computing device 100. The sensor circuitry 106 may issue a latency alert for an interrupt 111 if the corresponding maximum latency limit is exceeded or an interval alert for an interrupt 111 if the corresponding maximum interval limit is exceeded, for instance. The limit registers 128 and 130 are read-and-write registers from the perspective of the secure circuitry 106, and may be able to be read but not written by other components of the IC 102 and/or components external to the IC 102.

The monitoring interface 112 can include latency and interval alert registers 132 and 134 and latency and interval alert mask registers 136 and 138. The registers 132, 134, 136, and 138 are each a multiple-bit register having a number of bits corresponding to the interrupts 111. The alert registers 132 and 134 store alerts that the secure circuitry 106 has triggered. If the maximum latency limit for an interrupt 111 has been exceeded, the secure circuitry 106 may thus set a corresponding bit of the latency alert register 132. If the maximum interval limit for an interrupt 111 has been exceeded, the secure circuitry 106 may set a corresponding bit of the interval alert register 134. The alert registers 132 and 134 are read-and-write registers from the perspective of the secure circuitry 106, and may be able to be read but not written by other components of the IC 102 and/or components external to the IC 102.

The latency and interval alert mask registers 136 and 138 store alert masks indicating the interrupts 111 for which the secure circuitry 106 is to report latency and interval alerts, respectively. If a latency alert is to be reported for an interrupt 111 when the corresponding maximum latency limit has been exceeded, a bit of the latency alert mask register 136 is set to one (i.e., high). If an interval alert is to be reported for an interrupt 111 when the corresponding maximum interval limit has been exceeded, a bit of the interval alert mask register 138 is set to one (i.e., high).

The alert registers 132 and 134 are thus respectively masked by the alert mask registers 136 and 138. Even if a bit of the latency alert register 132 corresponding to an interrupt 111 is set, masking of the register 132 with the latency alert mask register 136 will not result in reporting of a latency alert for the interrupt 111 if the corresponding bit of the register 136 is not set. Similarly, even if a bit of the interval alert register 134 corresponding to an interrupt 111 is set, masking of the register 134 with the interval alert mask register 138 will not result in reporting of an interval alert for the interrupt 111 if the corresponding bit of the register 138 is not set. The alert mask registers 136 and 138 may be read-and-write registers from the perspective of components of the IC 102 other than the secure circuitry 106 and/or from the perspective of components external to the IC 102, and may be able to be read but not written by the circuitry 106.

The secure circuitry 106 is bidirectionally communicatively connected to the monitoring interface 112 in that the circuitry 106 can read from and/or write to various of the registers 114, 115, 116, 118, 120, 122, 123, 124, 126, 128, 130, 132, 134, 136, and 138. There may also be bidirectional communicative connection between the monitoring interface 112 and other components internal to the IC 102, as indicated by bidirectional arrow 140. Similarly, there may be bidirectional communicative connection between the monitoring interface 112 and components external to the IC 102, as indicated by the bidirectional arrow 142.

By triggering alerts on the alert register 132 as masked by the alert mask register 136, for instance, the secure circuitry 106 can cause actions to be performed to resolve issues impermissibly preventing the interrupts 111 from being handled in a timely manner. By triggering alerts on the alert register 134 as masked by the alert mask register 138, the secure circuitry 106 can cause actions to be performed to resolve issues impermissibly preventing the interrupts 111 from occurring on a timely basis. As examples, an application being run on the computing device 100 may have its execution terminated, paused, or restarted, or the device 100 itself may be restarted.

Figure 2:
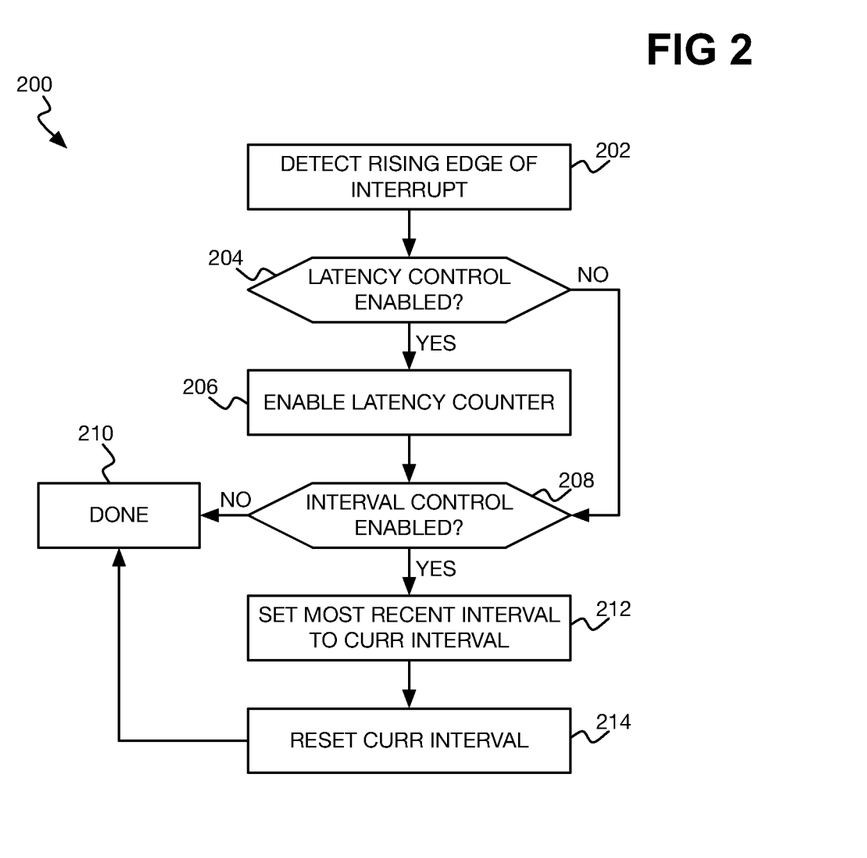
FIG. 2 is a flowchart of an example method for monitoring an interrupt, and which is specifically performed responsive to a rising edge of the interrupt.
Figure 3:
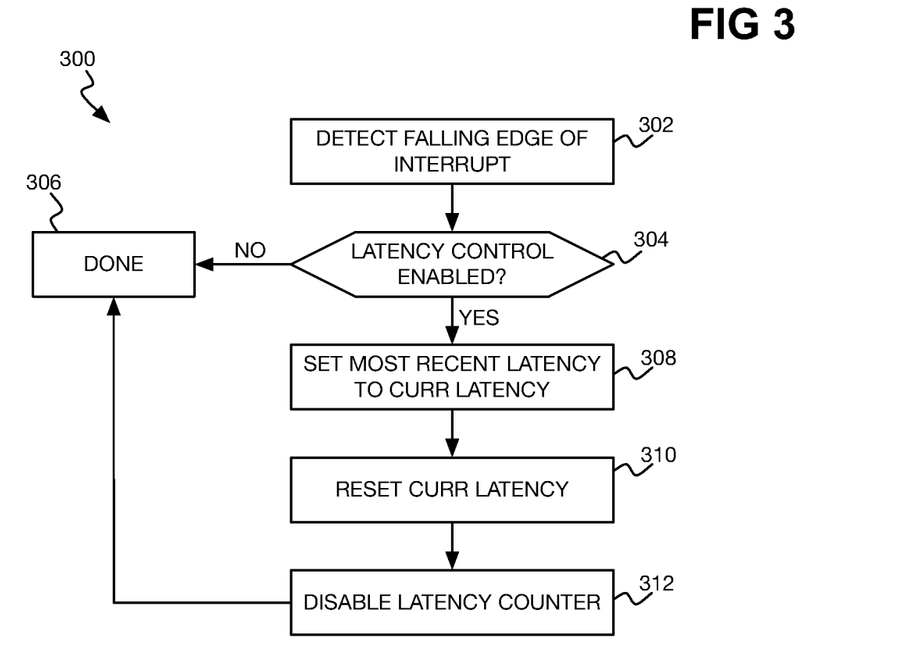
FIG. 3 is a flowchart of an example method that is used in conjunction with the method of FIG. 2 for monitoring an interrupt, and which is specifically performed responsive to a falling edge of an interrupt.
Figure 4:
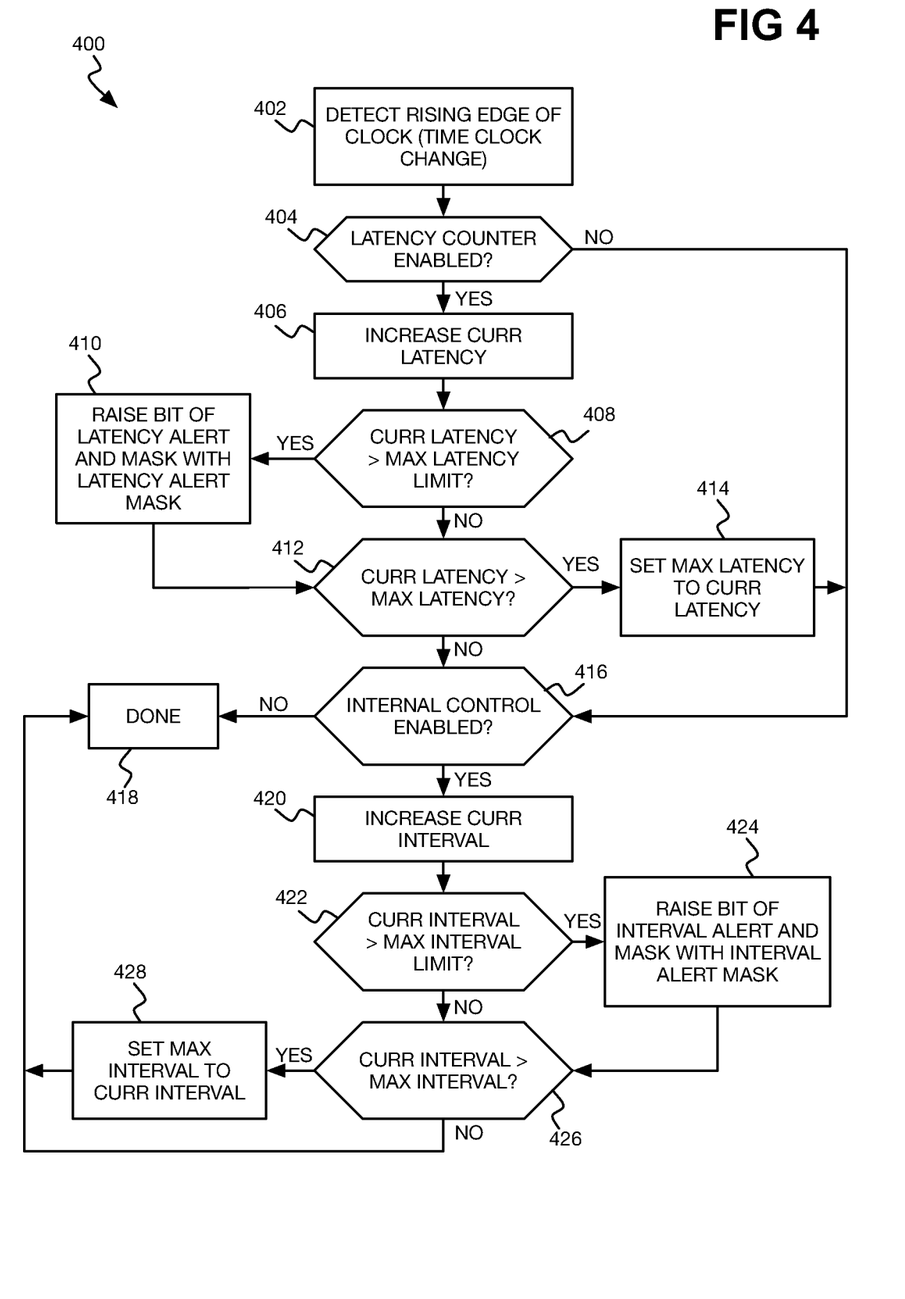
FIG. 4 is a flowchart of an example method that is used in conjunction with the methods of FIGS. 2 and 3 for monitoring an interrupt, and which is specifically performed responsive to a time clock change (e.g., a rising edge of a time clock).

How the secure circuitry 106 monitors the interrupts 111 to detect impermissible delay in their processing and impermissible suppression of their being raised is now described, in relation to FIGS. 2, 3, and 4. FIG. 2 shows an example method 200 that is performed by the secure circuitry 106 responsive to a rising edge of an interrupt 111. FIG. 3 shows an example method 300 that is performed by the secure circuitry 106 responsive to a falling edge of an interrupt 111. FIG. 4 shows an example method 400 that is performed by the secure circuitry 106 responsive a rising edge of the time clock 104.

The methods 200, 300, and 400 can each be implemented as program code stored on a non-transitory computer-readable data storage medium and executable by a processor. For instance, the secure circuitry 106 may be implemented as a general-purpose processor, in which case the medium and the processor are separate discrete components of the circuitry 106. As another example, the secure circuitry 106 may be implemented as a specific-purpose processor, in which case the medium and the processor may be integrated within the circuitry 106 as an ASIC.

In FIG. 2, the secure circuitry 106 detects a rising edge of an interrupt 111 (202). For instance, the secure circuitry 106 detects that the bit of the interrupt interface 110 corresponding to the interrupt 111 has changed or transitioned from zero to one (i.e., from low to high). The secure circuitry 106 thus detects that the interrupt 111 has been newly raised or asserted, or has newly occurred. If latency control has been enabled for the interrupt 111 (204), then the secure circuitry 106 enables the latency counter for the interrupt 111 (206). That is, if the bit of the latency control register 114 corresponding to the interrupt 111 has been set, then the secure circuitry 106 sets the bit of the latency counter register 115 corresponding to the interrupt 111.

Next, if interval control has not been enabled for the interrupt 111 (208), then the method 200 is finished (210). That is, if the bit of the interval control register 122 corresponding to the interrupt 111 has not been set, then the method 200 is finished. If interval control has been enabled for the interrupt 111 (208), however, then the secure circuitry 106 sets the most recent interval for the interrupt 111 to the current interval for the interrupt 111 (212), and resets the current interval for the interrupt 111 to zero (214). That is, the most recent interval register 124 for the interrupt 111 is set to the current interval register 123 for the interrupt 111, and the current interval register 123 is reset to zero.

In the method 200, therefore, when an interrupt 111 is raised, the latency counter for the interrupt 111 is set to indicate that the current latency of the interrupt 111 should begin being tracked if interrupt latency is to be monitored. An interrupt 111 being raised also means that the current interval of the interrupt 111 that may be being tracked is now complete. The most recent interval of the interrupt 111 can thus be set to the current interval of the interrupt 111 and the current interval reset to start tracking the interval that just began, if interrupt interval is being monitored.

In FIG. 3, the secure circuitry 106 detects a falling edge of an interrupt 111 (302). For instance, the secure circuitry 106 detects that the bit of the interrupt interface 110 corresponding to the interrupt 111 has changed or transitioned from one to zero (i.e., from high to low). The secure circuitry 106 thus detects that the interrupt 111 has been handled, processed, or otherwise cleared or released. If latency control has not been enabled for the interrupt 111 (204), then the method 300 is finished. That is, if the bit of the latency control register 114 corresponding to the interrupt 111 has not been set, then the method 300 is finished (306).

However, if latency control has been enabled for the interrupt 111 (304), then the secure circuitry 106 sets the most recent latency for the interrupt 111 to the current latency for the interrupt 111 (308). That is, the most recent latency register 118 for the interrupt 111 is set to the current latency register 116 for the interrupt 111. The secure circuitry 106 then resets the current latency for the interrupt 111 to zero (310), and disables the latency counter for the interrupt 111 (312). That is, the current latency register 116 for the interrupt 111 is set to zero, and the bit of the latency counter register 115 corresponding to the interrupt 111 is reset to zero.

In the method 300, therefore, an interrupt 111 being released after having been set means that the current latency of the interval 111 that may be being tracked is now complete. The most recent latency of the interrupt 111 can thus be set to the current latency of the interrupt, if interrupt latency is being monitored. The latency counter for the interrupt 111 is disabled to indicate that the current latency of the interrupt 111 is no longer to be tracked until the interrupt 111 is raised again. The current latency is reset to zero so that tracking the latency is ready to be started when the interrupt 111 is raised again.

In FIG. 4, the secure circuitry 106 detects a rising edge of the time clock 104 (402). That is, the secure circuitry 106 detects the rising edge of a clock cycle within the clock signal provided by the clock 104. The secure circuitry 106 thus detects a time clock change, in that the circuitry 106 detects a new time clock cycle within the clock signal. For each interrupt 111, if the latency counter for the interrupt 111 has been enabled (404), then the current latency of the interrupt 111 is increased. That is, the current latency register 116 for each interrupt 111 for which the corresponding bit of the latency counter register 115 has been set is incremented by one. This means that the latency of each such interrupt 111 has been incremented by one, corresponding to a rising edge and thus another clock cycle of the time clock 104.

For each interrupt 111, if the current latency of the interrupt 111 is greater than the maximum latency limit specified by the maximum latency limit register 128 for the interrupt 111 (408), then the secure circuitry 106 raises or sets the corresponding bit of the latency alert register 132 and masks the register 132 with the latency alert mask of the latency alert mask register 138 (410). As such, the secure circuitry 106 can trigger a latency alert for each interrupt 111 as soon as the latency of the interrupt 111 exceeds its corresponding maximum latency limit. That is, the secure circuitry 106 does not have to wait until the interrupt 111 in question has been released or cleared.

An alert bit of the latency alert register 132 corresponding to an interrupt 111 is thus set to one (i.e., high) responsive to the current latency of the interrupt 111 being greater than the maximum latency limit for the interrupt 111. However, if the corresponding masking bit of the latency alert mask register 136 is also not set to one, then the masking of the register 132 with the register 136 will result in the alert bit in question still being zero within the latency alert register 132. That is, the corresponding masking bit of the alert mask register 136 is set to one to indicate that latency alerts are to be triggered for the interrupt 111 in question, and is set to zero to indicate that such alerts are not to be triggered. Therefore, even if the alert bit for the interrupt 111 is set to one within the alert register 132, if the corresponding masking bit of the mask register 136 is set to zero, then the alert bit of the register 132 as masked will remain zero.

Next, for each interrupt 111, if the current latency of the interrupt 111 is greater than the maximum latency specified in the maximum latency register 120 for the interrupt 111 (412), then the secure circuitry 106 sets the maximum latency of the interrupt 111 to the current latency of the interrupt 111 (412). That is, the secure circuitry 106 sets the maximum latency register 120 of an interrupt 111 to the current latency register 116 of the interrupt 111. The secure circuitry 106 can thus update the maximum latency register 120 for an interrupt 111 as the current latency of the interrupt 111 exceeds the prior maximum latency, and does not have to wait until the interrupt 111 has been released or cleared.

For each interrupt 111 for which interval control has not been enabled (416), the method 400 is finished as to that interrupt 111 (418). That is, the method 400 is finished for each interrupt 111 for which the corresponding bit within the interval control register 122 has not been set. However, for each interrupt 111 for which interval control has been enabled, the current interval is increased (420). That is, the current interval register 123 for each such interrupt 111 is incremented by one. This means that the interval of each interrupt 111 for which interval monitoring has been enabled is incremented by one, corresponding to a rising edge and thus another clock cycle of the time clock 104.

For each interrupt 111, if the current interval of the interrupt 111 is greater than the maximum interval limit specified by the maximum interval limit register 130 for the interrupt 111 (422), then the secure circuitry 106 raises or sets the corresponding bit of the interval alert register 134 and masks the register 134 with the interval alert mask of the interval alert mask register 138 (424). As such, the secure circuitry 106 can trigger an interval alert for each interrupt 111 as soon as the interval of the interrupt 111 exceeds its corresponding maximum interval limit. The secure circuitry 106 does not have to wait until the interrupt 111 in question has again been raised such that the current interval of the interrupt 111 is completed.

Next, for each interrupt 111, if the current interval of the interrupt 111 is greater than the maximum interval specified in the maximum interval register 126 for the interrupt 111 (426), then the secure circuitry 106 sets the maximum interval of the interrupt 111 to the current interval of the interrupt 111 (428). That is, the secure circuitry 106 sets the maximum interval register 126 to the current interval register 123 of the interrupt 111. The secure circuitry 106 can thus update the maximum interval register 123 for an interrupt 111 as the current interval of the interrupt 111 exceeds the prior maximum interval, and does not have to wait until the interrupt 111 is again raised such that the current interval of the interrupt 111 is completed.

In the methods 200, 300, and 400 that haven been described, functionality as to the triggering of latency alerts and as to setting of maximum latency can be performed even before an interrupt 111 has been released. This is the functionality performed in parts 406, 408, 410, 412, and 414 of the method 400. However, in another implementation, the functionality may instead be performed when an interrupt 111 is released. That is, the functionality can instead be performed as part of the method 300, such as between parts 304 and 308 or between parts 308 and 310.

Similarly, in the methods 200, 300, and 400 that have been described, functionality as to the triggering of interval alerts and as to setting of maximum interval can be performed even before an interrupt 111 is asserted again such that the current interval of the interrupt 111 has been completed. This is the functionality performed in parts 420, 422, 424, 426, and 428 of the method 400. However, in another implementation, the functionality may instead be performed when an interrupt 111 is raised, signaling that the current interval of the interrupt 111 has been completed. That is, the functionality can instead be performed as part of the method 200, such as between parts 208 and 212 or between parts 212 and 214.

Figure 5:
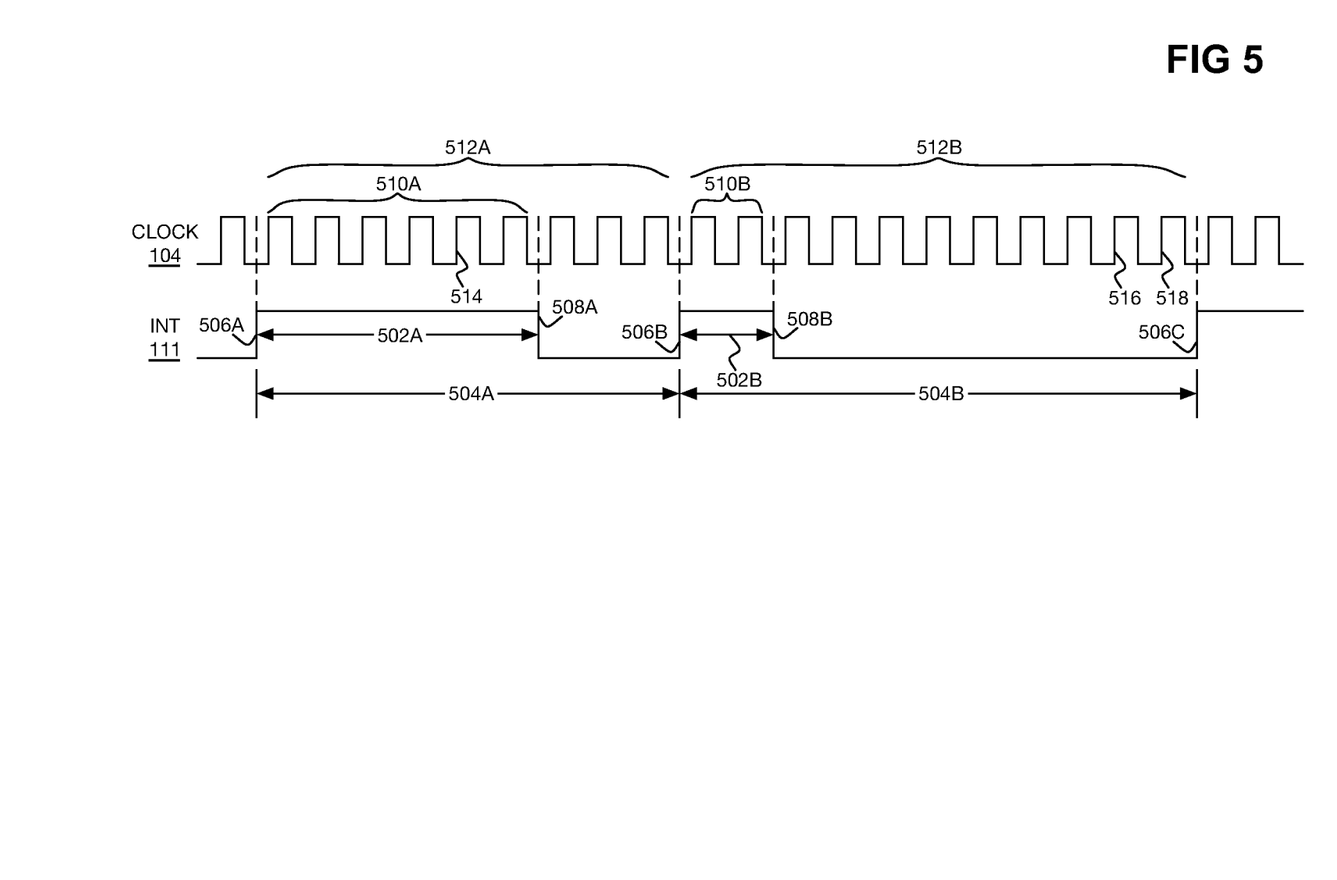
FIG. 5 is a diagram of an example interrupt and an example time clock, in relation to which example performance of the methods of FIGS. 2, 3, and 4 is described.

FIG. 5 shows an example clock signal of the time clock 104 and an example interrupt signal of an interrupt 111, in relation to which example performance of the methods 200, 300, and 400 is described. The first time the interrupt 111 is raised, the interrupt 111 has a latency 502A until it is cleared, and the second time the interrupt 111 is raised, the interrupt 111 has a latency 502B until it is cleared, where the latency 502B is shorter than the latency 502A. Between the first and second times the interrupt 111 is raised, the interrupt 111 has an interval 504A, and between the second and third times the interrupt 111 is raised, the interrupt has an interval 504B that is longer than the interval 504A.

The latency 502A is measured between the rising edge 506A and the falling edge 508A immediately thereafter, and the latency 502B is similarly measured between the rising edge 506B and the falling edge 508B immediately thereafter. The interval 504A is measured between the rising edge 506A and the rising edge 506B immediately thereafter (i.e., between the consecutive rising edges 506A and 506B). The interval 504B is measured between the rising edge 506B and the rising edge 506C immediately thereafter (i.e., between the consecutive rising edges 506B and 506C).

The clock signal of the time clock 104 includes six clock cycles 510A between the rising edge 506A and the falling edge 508A of the interrupt signal of the interrupt 111, such that the latency 502A is equal to six clock cycles in length. The clock signal of the time clock 104 includes nine clock cycles 512A, including the six clock cycles 510A, between the rising edges 506A and 506B of the interrupt signal, such that the interval 504A is equal to nine clock cycles in length. The rising edge of the fifth clock cycle 510A/512A is specifically called out in the figure.

The clock signal of the time clock 104 includes two clock cycles 510B between the rising edge 506B and the falling edge 508B of the interrupt signal of the interrupt 111, such that the latency 502B is equal to two clock cycles in length. The clock signal of the time clock 104 includes eleven clock cycles 512B, including the two clock cycles 510B, between the rising edges 506B and 506C of the interrupt signal, such that the interval 504B is equal to eleven clock cycles in length. The rising edges 516 and 518 of the tenth and eleventh clock cycles 512B, respectively, are specifically called out in the figure.

As the rising edge of each clock cycle 510A/510B is detected, the method 400 is performed. The current latency register 116 and the maximum latency register 120 for the interrupt 111 are each incremented with each clock cycle 510A. Therefore, at the end of the clock cycles 510A, the registers 116 and 120 store six clock cycles. If the maximum latency limit register 128 for the interrupt 111 is set to four clock cycles, a latency alert is triggered for the interrupt 111 when the method 400 is performed responsive to the rising edge 514 of the fifth clock cycle 510A. The current interval register 123 and the maximum interval register 126 for the interrupt 111 are each incremented with each clock cycle 512A. Therefore, at the end of the clock cycles 512A, the registers 123 and 126 are set to nine clock cycles.

When the falling edge 508A of the interrupt signal is detected, the method 300 is performed. The most recent latency register 118 for the interrupt 111 is set to the current latency register 116 for the interrupt 111, and thus to six clock cycles. The current latency register 116 for the interrupt 111 is then reset to zero clock cycles. When the rising edge 506B of the interrupt signal is detected, the method 200 is performed. The most recent interval register 126 for the interrupt 111 is set to the current interval register 123 for the interrupt 111, and thus to nine clock cycles. The current interval register 123 for the interrupt 111 is then reset to zero clock cycles.

As the rising edge of each clock cycle 510B/512B is detected, the method 400 is again performed. The current latency register 116 for the interrupt 111 is incremented with each clock cycle 510B. Therefore, at the end of the clock cycles 510B, the register 116 stores two clock cycles. The current interval register 123 for the interrupt 111 is incremented with each clock cycle 512B. Therefore, at the end of the clock cycles 512B, the register 123 stores eleven clock cycles.

When the method 400 is performed responsive to the rising edge 516 of the tenth clock cycle, the current interval register 123 stores ten clock cycles, which exceeds the maximum interval register 126 of nine clock cycles. Therefore, the maximum interval register 126 for the interrupt 111 is set to the current interval register 123 for the interrupt 111. The maximum interval register 126 is similarly set to the current interval register 123 when the method 400 is performed responsive to the rising edge 518 of the eleventh clock cycle 512B. If the maximum interval limit register 130 for the interrupt 111 is set to ten clock cycles, a latency alert is also triggered for the interrupt 111 when the method 400 is performed responsive to the rising edge 518 of the eleventh clock cycle 512B.

Figure 6:
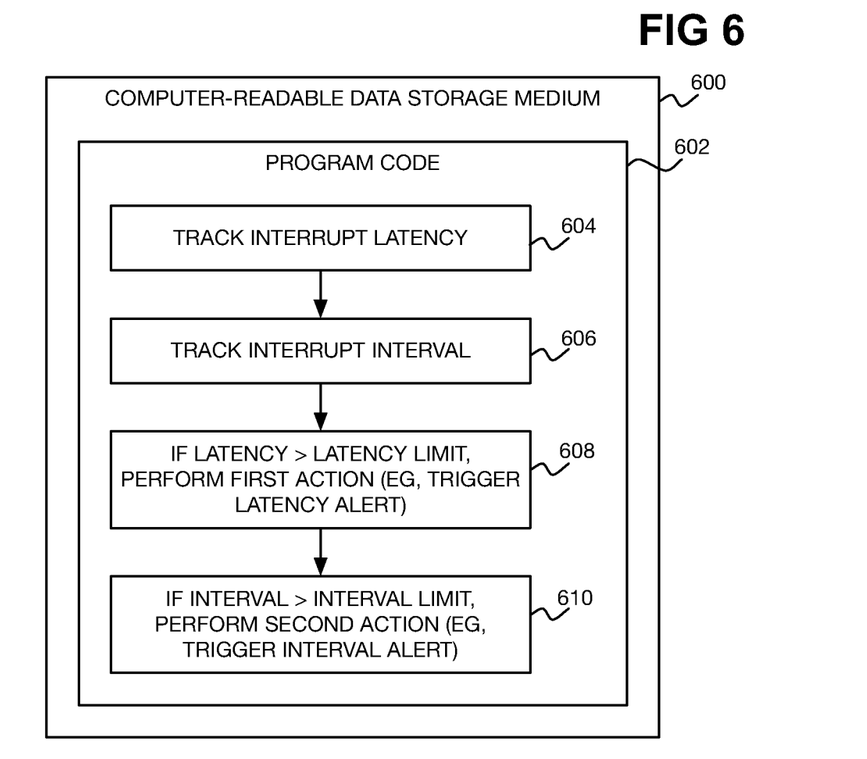
FIG. 6 is a diagram of an example non-transitory computer-readable data storage medium storing program code executable by the secure circuitry of FIG. 1 to monitor an interrupt.

FIG. 6 shows an example non-transitory computer-readable data storage medium 600 storing program code 602 executable by the secure circuitry 106 of the IC 102 to perform processing. The processing includes tracking a latency between when an interrupt 111 occurred and when the interrupt 111 was released (604). The processing further includes tracking an interval between consecutive occurrences of the interrupt 111 (606).

The processing includes, in response to the latency exceeding a latency limit, performing a first action (608). The latency limit corresponds to a maximum length of time in which a processor different than and securely isolated from the secure circuitry 106 and responsible for handling the interrupt 111 is expected to handle the interrupt 111. The latency exceeding the latency limit can indicate that the processor is impermissibly not handling the interrupt 111 in a timely manner. The first action may be the triggering of a latency alert, or an action that resolves an issue impermissibly preventing the interrupt 111 from being handled in a timely manner, such as rebooting the computing device 100, or restarting, pausing, or terminating the application currently being executed by a processor of the device 100.

The processing includes, in response to the interval exceeding an interval limit, performing a second action (610). The interval limit corresponds to a maximum expected length of time between the consecutive occurrences of the interrupt 111. The interval exceeding the interval limit can indicate that a processor different than and securely isolated from the secure circuitry 106 has impermissibly prevented the interrupt 111 from occurring on a timely basis. The second action may be the triggering of an interval alert, and thus a different action than the first action. The second action may instead resolve an issue impermissibly preventing the interrupt from occurring on a timely basis, and which may be the same action as the first action.

Figure 7:
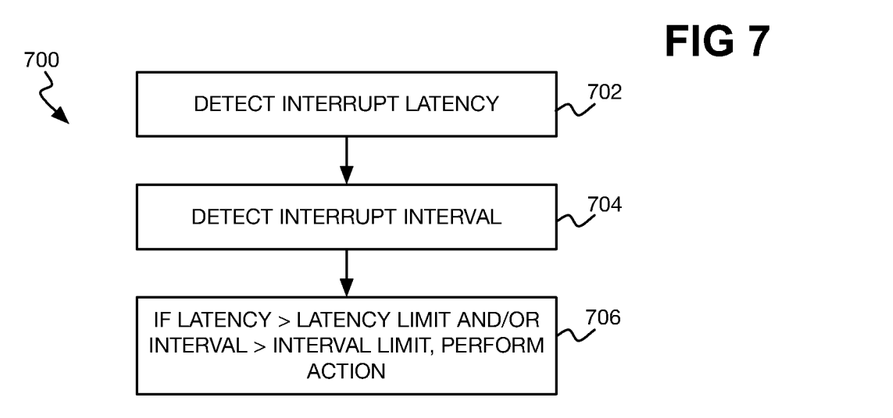
FIG. 7 is a flowchart of an example method performed by the secure circuitry of FIG. 1 to monitor an interrupt.

FIG. 7 shows an example method 700 that can be performed by the secure circuitry 106 of the IC 102. The method 700 includes detecting a latency between when an interrupt 111 occurred and when the interrupt 111 was released in correspondence with handling of the interrupt 111 (702). The method 700 includes detecting an interval between consecutive occurrences of the interrupt 111 (704). The method 700 includes, in response to either or both of the latency exceeding a latency limit and the interval exceeding an interval limit, performing an action (706).

Techniques have been described for monitoring interrupts 111. The techniques specifically monitor the latency and interval of each interrupt 111. Whether the interrupts 111 are being timely handled and whether the interrupts 111 are not occurring on a timely basis can thus be detected, which may be indicative of a compromise in the security of the computing device 100 in which the interrupts 111 are raised.

We claim:

1. A method comprising:
    detecting, by secure circuitry, a latency between when an interrupt occurred and when the interrupt was processed in correspondence with handling of the interrupt;
    detecting, by the secure circuitry, an interval between consecutive occurrences of the interrupt; and
    in response to either or both of the latency exceeding a latency limit and the interval exceeding an interval limit, performing, by the secure circuitry, an action, wherein:
        the latency limit corresponds to a maximum length of time in which a processor different than and securely isolated from the secure circuitry and responsible for handling the interrupt is expected to handle the interrupt; and
        the latency exceeding the latency limit indicates that the processor is impermissibly not handling the interrupt in a timely manner.

2. The method of claim 1, wherein the action resolves an issue causing the processor to impermissibly not handle the interrupt in the timely manner.

3. The method of claim 1, wherein the interval limit corresponds to a maximum expected length of time between the consecutive occurrences of the interrupt,
    and wherein the interval exceeding the interval limit indicates that a processor different than and securely isolated from the secure circuitry has impermissibly prevented the interrupt from occurring on a timely basis.

4. The method of claim 3, wherein the action resolves an issue causing the processor to impermissibly prevent the interrupt from occurring on the timely basis.

5. The method of claim 1, wherein performing the action comprises:
    in response to the latency exceeding the latency limit, performing a first action; and
    in response to the interval exceeding the interval limit, performing a second action different than the first action.

6. A non-transitory computer-readable data storage medium storing program code executable by secure circuitry to:

track a latency between when an interrupt occurred and when the interrupt was processed;

track an interval between consecutive occurrences of the interrupt; and in response to either or both of the latency exceeding a latency limit and the interval exceeding an interval limit, performing, by the secure circuitry, an action, wherein:

the latency limit corresponds to a maximum length of time in which a processor different than and securely isolated from the secure circuitry and responsible for handling the interrupt is expected to handle the interrupt; and the latency exceeding the latency limit indicates that the processor is impermissibly not handling the interrupt in a timely manner.

7. The non-transitory computer-readable data storage medium of claim 6, wherein the program code is executable by the secure circuitry to further:

in response to the latency exceeding the latency limit, perform a first action to resolve an issue impermissibly preventing the interrupt from being handled in a timely manner; and in response to the interval exceeding the interval limit, perform a second action to resolve an issue impermissibly preventing the interrupt from occurring on a timely basis.

8. The non-transitory computer-readable data storage medium of claim 6, wherein the program code is executable by the secure circuitry to track the latency by:

in response to a rising edge of the interrupt, enabling a latency counter;

in response to a time clock change, increasing the latency if the latency counter is enabled; and in response to a falling edge of the interrupt, setting a most recent latency to the latency, resetting the latency, and disabling the latency counter.

9. The non-transitory computer-readable data storage medium of claim 6, wherein the program code is executable by the secure circuitry to track the interval by:

in response to a time clock change, increasing the interval; and in response to a rising edge of the interrupt, setting a most recent interval to the interval and resetting the interval.

10. An integrated circuit comprising:

an interrupt interface on which a plurality of interrupts are monitored;

a monitoring interface on which alerts are triggered responsive to monitoring of the interrupts; and secure circuitry to:

for each interrupt, track a latency between when the interrupt occurred and when the interrupt was processed;

for each interrupt, track an interval between consecutive occurrences of the interrupt; and trigger, in response to both the latency exceeding a latency limit and the interval exceeding an interval limit, a latency alert and an interval alert, wherein:

the latency limit corresponds to a maximum length of time in which a processor different than and securely isolated from the secure circuitry and responsible for handling the interrupt is expected to handle the interrupt; and the latency exceeding the latency limit indicates that the processor is impermissibly not handling the interrupt in a timely manner.

11. The integrated circuit of claim 10, wherein the interrupt interface comprises a plurality of bits corresponding to the interrupts, and wherein each bit is high when the corresponding interrupt occurs and is low when the corresponding interrupt has been processed.

12. The integrated circuit of claim 11, wherein the secure circuitry is to track the latency for each interrupt by:

in response to the bit corresponding to the interrupt transitioning from low to high, enable a latency counter for the interrupt;

in response to a time clock change, increase the latency for the interrupt if the latency counter for the interrupt is enabled; and in response to the bit corresponding to the interrupt transiting from high to low, setting a most recent latency for the interrupt to the latency for the interrupt, resetting the latency for the interrupt, and disabling the latency counter for the interrupt.

13. The integrated circuit of claim 11, wherein the secure circuitry is to track the interval for each interrupt by:

in response to a time clock change, increasing the interval for the interrupt; and in response to the bit corresponding to the interrupt transitioning from low to high, setting a most recent interval for the interrupt to the interval for the interrupt and resetting the interval for the interrupt.

14. The integrated circuit of claim 10, wherein the monitoring interface comprises a multiple-bit latency alert having a plurality of bits corresponding to the interrupts, and a multiple-bit interval alert having a plurality of bits corresponding to the interrupts, and wherein each bit of the multiple-bit latency alert is raised when the latency of the corresponding interrupt exceeds the latency limit, and each bit of the multiple-bit interval alert is raised when the interval of the corresponding interrupt exceeds the interval limit.

* * * * *